United States Patent [19]

Retter

[11] Patent Number: 4,917,516
[45] Date of Patent: Apr. 17, 1990

[54] COMBINATION COMPUTER KEYBOARD AND MOUSE DATA ENTRY SYSTEM

[76] Inventor: Dale J. Retter, 7350 Via Paseo Del Sur, E #206, Scottsdale, Ariz. 85258

[21] Appl. No.: 231,952

[22] Filed: Aug. 15, 1988

Related U.S. Application Data

[63] Continuation-in-part of Ser. No. 16,018, Feb. 18, 1987, abandoned.

[51] Int. Cl.$^4$ .............................................. B41J 5/08
[52] U.S. Cl. .................................... 400/489; 340/710
[58] Field of Search ........................ 400/485, 489, 100; 340/710, 711, 365 A

[56] References Cited

U.S. PATENT DOCUMENTS

| | | | |
|---|---|---|---|
| 470,874 | 3/1892 | Glidden . | |
| 760,851 | 5/1904 | Crawford-Frost . | |
| 943,466 | 12/1909 | Rowell . | |
| 1,336,122 | 4/1920 | Banaji . | |
| 1,506,426 | 8/1924 | Hoke . | |
| 2,040,248 | 5/1936 | Dvorak et al. . | |
| 2,080,457 | 5/1937 | Bower . | |
| 2,318,519 | 5/1943 | Palanque . | |
| 2,369,807 | 2/1945 | Solon . | |
| 2,532,228 | 11/1950 | Hesh . | |
| 3,022,878 | 2/1962 | Seibel et al. . | |
| 3,633,724 | 1/1972 | Samuel . | |
| 3,698,532 | 10/1972 | Dodds . | |
| 3,847,263 | 11/1974 | X . | |
| 3,937,939 | 2/1976 | Frenkel | 235/156 |
| 3,945,482 | 3/1976 | Einbinder . | |
| 3,965,315 | 6/1976 | Wuenn | 200/6 A |
| 3,967,273 | 6/1976 | Knowlton . | |
| 3,970,185 | 7/1976 | Shelton . | |
| 4,029,915 | 6/1977 | Ojima | 200/5 A |
| 4,201,489 | 5/1980 | Zapp | 400/485 |
| 4,211,497 | 7/1980 | Montgomery | 400/486 |
| 4,241,409 | 12/1980 | Nolf | 364/705 |
| 4,244,659 | 1/1981 | Malt | 400/486 |
| 4,255,626 | 3/1981 | Watts et al. | 200/6 A |
| 4,310,254 | 1/1982 | D'Angiolillo | 400/109 |
| 4,332,493 | 6/1982 | Einbinder | 400/484 |
| 4,369,439 | 1/1983 | Broos | 340/710 |
| 4,464,652 | 8/1984 | Lapson et al. | 340/710 |
| 4,514,726 | 4/1985 | Whetstone et al. | 340/710 |
| 4,550,316 | 10/1985 | Whetstone et al. | 340/710 |
| 4,581,761 | 4/1986 | Ichinokawa et al. | 340/710 X |
| 4,584,493 | 4/1986 | Yaeger | 400/485 X |
| 4,635,496 | 1/1987 | McTyre | 340/710 X |
| 4,698,626 | 10/1987 | Sato et al. | 340/710 |
| 4,712,101 | 12/1987 | Culver | 340/710 |
| 4,754,268 | 6/1988 | Mori | 340/710 |
| 4,767,923 | 8/1988 | Yuasa | 340/710 X |
| 4,772,882 | 9/1988 | Mical | 340/710 X |
| 4,797,665 | 1/1989 | Ida et al. | 340/710 |
| 4,799,049 | 1/1989 | Avila | 340/710 X |
| 4,806,917 | 2/1989 | Hosogoe | 340/710 |

FOREIGN PATENT DOCUMENTS

| | | | |
|---|---|---|---|
| 885074 | 11/1981 | U.S.S.R. | 400/489 |
| 2076743 | 12/1981 | United Kingdom | 400/489 |
| 8201345 | 4/1982 | World Int. Prop. O. | 400/489 |

OTHER PUBLICATIONS

IBM Tech. Disc. Bulletin, "Keyboard", Seibel et al., vol. 3, No. 6, Nov. 1960, p. 16.
Xerox Disc. Journ., "Semi-Captive Keyboard", Kowalski, vol. 1, No. 2, Feb. 1976, p. 85.
IBM Tech. Disc. Bulletin, "Kana Keyboard with Palm Rest", Uchiyama, vol. 25, No. 9, Feb. 1983, pp. 4915-4916.

*Primary Examiner*—Eugene H. Eickholt
*Attorney, Agent, or Firm*—LaValle D. Ptak

[57] ABSTRACT

A data input device particularly suited for computers includes a housing which also contains a computer mouse. The mouse functions are executed by moving the entire housing member, and the fingers never move away from their constant "home" key positions for the data input keys. The normal left and right hand keyboard functions are split between two separate keyboard housings adapted to underlie the palms of the left and right hands, respectively. Finger wells are provided for the fingers of the operator along with a thumb well in each keyboard member. Data input keys are mounted at various positions within these wells for producing keyed input data to the computer; and the mouse (mice) has (have) a surface movement detecting apparatus for inputting spatial mouse movement signals to the computer.

17 Claims, 2 Drawing Sheets

COMBINATION COMPUTER KEYBOARD AND MOUSE DATA ENTRY SYSTEM

RELATED APPLICATION

This application is a Continuation-In-Part of co-pending application Ser. No. 07/016,018, filed on Feb. 18, 1987 and now abandoned.

BACKGROUND

The transmission of alpha-numeric information from person to another currently essentially is carried out by means of four different data entry techniques. These include sticks (chisel on stone, pencils, pens, markers, and the like), keyboards (typically used with typewriters, computers, and word processors), spatial devices (computer "mice", track balls, joy sticks, and the like used with computers); and voice (direct human communication and voice responsive computer systems). At the present state of technology, word processors and computers primarily rely upon data entry keyboards and the various spatial devices for inputting information into the computer, electronic typewriter, or word processor for subsequent display and/or printing. Of these techniques, keyboards are the most widely used today and may computers use a combination of keyboards and spatial devices (such as the movable "mice" which have become highly popular since 1980 for example on the Apple McIntosh Computer).

The now standard keyboard character assignment used in conjunction with typewriters and computers has what is known as the "QWERTY" key arrangement. This designation is named after the top row of letters in the four row keyboard. The "QWERTY" arrangemend was invented and patented over 100 years ago and resulted from some unique characteristics of the all mechanical typewriters which existed at the time of the invention. One problem with early mechanical typewriters was that the entire force for providing the mechanical energy was to operate most of the typing function was provided by the force with which the key was struck. In addition to moving the typebar, this force also released the carriage and moved the ribbon forward with no other energy source.

Early keyboards utilized a simple alphabetic layout, but it was quickly discovered that the typebar of the early, crude, mechanical typewriters frequently jammed once a typist learned how to use the keyboard. After substantial experimentation, the "QWERTY" keyboard was developed to place the most commonly used letters in English at the opposite sides of the type basket. The keyboard itself was laid out to provide direct mechanical connections to the various letters. Consquently, many of the commonly used letters were placed away from the "home" (center) row where the fingers normally rested. In addition, the "QWERTY" keyboard was designed with another slow-down technique by causing common letter pairs to be struck by the same finger on the same hand. This is the slowest motion for successive letters which could be developed. The "QWERTY" keyboard also introduced two function keys the "CAP LOCK" and "SHIFT" key which allowed upper and lower case letters to be activated by the same key and allowed the upper row of keYs (the numbers and punctuations) to share the same keys. This was in contrast to typewriters less advanced than "QWERTY" which had eight rows of keys instead of the basic four rows for "QWERTY". The early widespread popularity of the "QWERTY" mechanical typewriter resulted in nearly universal adoption of the "QWERTY" keyboard layout.

The "QWERTY" keyboard continued to be used, because of widespread mastery by secretaries and data input operators, even after the reasons for its original development no longer were applicable. Electric typewriters eased the finger burden by allowing the keystroke to mechanically access an electric motor which then provided the energy to complete the mechanical process of printing and operating the other mechanism of the typewriter. Electric typewriters in turn have been replaced by electronic typewriters, word processors, and computers which completely eliminate the necessity for the inefficient "QWERTY" keyboard layout. This layout, however, has continued to dominate the market today, long after its need has disappeared. Computer keyboard buffers, which separate too quickly struck keys, eliminate all of the problems which the "QWERTY" keyboard originally was designed to overcome.

Efforts have been made to modify the layout of multi-key keyboards to improve efficiency. One such keyboard is disclosed in the keyboard to Dvorak U.S. Pat. No. 2,040,248. This keyboard was designed after an analysis of errors made with the standard "QWERTY" layout. The Dvorak layout concentrates the vowels and most frequently used letters on the "home" row so that there is much less moving around from row to row of the fingers of the typist. It has been found that this row to row movement in "QWERTY" keyboards and other multiple row keyboards results in most of the errors made by typists. In addition, the Dvorak keyboard changes the balance between the left and right hand. In a "QWERTY" keyboard the usage is 57% for the left hand, whereas in Dvorak the change is to 56% for the right hand better suited for right handed typists. Even though the Dvorak keyboard, however, has been known for over 50 years, it has not made may in-roads into the standard "QWERTY" keyboard world. Even with its greater efficiency, however, Dvorak keyboards still are subject to the requirement of movement over four rows of keys (when a number row is provided). This is inefficient and inherently presents a capacity for introduction of errors when the fingers move with little or no tactile feedback from one row to another away from the "home" row.

Other efforts at providing a more natural arrangement of keys to fit the natural shape of the hand and to utilize the significantly greater dexterity of the thumbs is typified in the keyboard arrangement of Malt U.S. Pat. No. 4,244,659. With ordinary keyboards such as the "QWERTY" and Dvorak keyboards, the eight fingers are used to produce all of the key strokes and the thumbs (primarily the right thumb) are used solely to operate the space bar. The thumb of the human hand, however, has more capability of finger movement than the index finger and is the most important and most-used digit of the hand. Malt recognized this and assigned each thumb six different keys or functions. In addition, the keys are laid out in a curved arrangement corresponding to the different lengths of the fingers on each hand. The keys for each hand also are separated into two groups with the thumb positions adjacent one another. Even though it appears to be a more efficient layout than a standard "QWERTY" keyboard, the Malt keyboard arragnement has not been widely adopted.

Once again, the fingers (and the thumbs) must move over multiple rows of keys; so that row to row and key to key movement errors still may be introduced wtih the Malt keyboard.

Other types of non-standard keyboard character assignments have been developed over the years in addition to the Dvorak and Malt keyboards discussed above, but in view of the minimal advantages obtained from such assignments over the standard "QWERTY" arrangement, no overriding reason has been presented to the industry to modify the well-established and well-known "QWERTY" keyboard arrangement.

An entirely different approach has been undertaken by others in the past to provide multiple switches or key assignments at each of several different fixed finger locations. Such an approach is disclosed in the Hesh U.S. Pat. No. 2,536,228. This patent is for electrically operated typewriters in which the keyboard location of the typewriter has been modified to provide two groups of five semi-circular keys. These keys underlie the thumb and forefingers, respectively, of the left and right hands. Each key may be operated by pivoting it forward, backward, left, right or by pushing it straight down to obtain five different outputs from each key position. These outputs then are used to operate the otherwise conventional mechanism of the electrical typewriter. Similar arrangements are shown in the Samuel U.S. Pat. No. 3,633,724 (for a typewriter) and Wuenn U.S. Pat. No. 3,965,315 (for a calculator). The Samuel typewriter employs only eight pivoted keys and utilizes the conventional space bar, return, and shift keys normally associated with standard typewriter keyboards.

The systems of Hesh, Samuel, and Wuenn, since they are placed on flat keyboard-like surfaces, do not provide support for the hands and fingers of the operator even though the layout of Hesh does place the keys in a semi-circular arrangement conforming to the relaxed position of the fingertips and thumb of each hand. It is very difficult for a keyboard operator to maintain the hands and fingers in a closely confined space unless supporting and stabilizing structure is provided.

A variation of the multiple switch location for each finger is disclosed in the keyboard of the Runge U.S. Pat. No. 4,265,557. The system of this patent provides clusters of keys operated by each finger. The keys of the cluster are closely associated around the finger in its "home" row position. One key rests above the operator's finger and is operated by raising the finger. There also are keys behind and in front of the conventional "home" row key, so that each finger is capable of operating four different keys or switches from the "home" row position. The Runge device "locks" the fingers into narrowly defined locations without providing physical support or tactile feedback for the hands and arms to maintain the precise locations required. As a practical matter, this makes maintaining the fingers and hands in the precise locations extremely difficult and fatiguing for more than brief time periods. Runge also does not take advantage of the capabilities of the thumb, which simply is left to operate a conventional space bar. The Runge device is a relatively complex set of mechanical lever arms subject to misadjustment and wear.

A conceptual illustration of a semi-captive keyboard employing multiple key operation from each of the fixed finger positions is shown in the "*Xerox Disclosure Journal*", Volumes 1, No. 2, Feb. 1986 (Page 85). No details of the keyboard are which the hand is placed palm down with the fingers and thumb extended. The fingers and thumb appear to enter into openings in a vertical, raised portion adjacent the flat palm receiving portion. In these openings, clusters of keys are placed around the fingers for operation by each finger. This disclosure lacks sufficient details for implementation into an operative system.

Another patent directed to a form of data entry device for generation of multiple symbols through a chording operation is disclosed in the United Kingdom Patent to Winkler No. 2,076,743. The upper surface of this data input device is shaped so that the hand of the operator may rest on it in a relaxed position. The base of the device supports the palm of the hand. The Winkler device is made with grooves in it to accomodate the fingers and essentially hold them immobile. Pressure sensitive switches are employed and they are located under the knuckles to be actuated by bony parts of the fingers. The device of Winkler has approximately eight keys. These include one key underlying each knuckle of each of the four fingers, two keys for the thumb, and keys for left and right hand sides of the palm of the hand. Thus, the device is not made for resting the palm of the hand with any pressure since pressure actuates the keys located under the palm. Data entry is accomplished by the actuation of multiple keys in various combinations to generate permutations of key operations which are interpreted as equivalent to a particular data entry key of a conventional keyboard. Different combinations of two or more keys are required for the various letter, number, punctuation and function symbols required for computer operation. This requires a very complex learning process for an operator, since the chording representations must be memorized, and the key operations consequently are significantly different from those required for a standard typewriter keyboard.

The Yaeger U.S. Pat. No. 4,584,443 is directed to an entirely different type of data input device. In Yaeger elongated bars are provided which are worn on the hands of an operator. The ends of the fingers of the operator are inserted into circular cups which captivate or hold the fingers within the cups. Each cup in turn is mounted on a spring to permit rocking motion in any one of two or three directions and, in some cases, downward or forward movement as well. Thus, each cup constitutes a single key. As constructed, the device of Yaeger always must return the cup to its neutral or home position before it can be used to actuate a switch in any other direction. The mounting of a spatial input device of any type on the glove-like data entry device of Yaeger is not practical because of the manner in which the fingers and thumbs are held captive in the device when it is in use. The fingertips or fingers of the operator of the Yaeger device are not freely received within fingertip wells but instead are held captive in continuous contact with a single key. The Yaeger device essentially is "worn" by the operator since it attaches to the hands like a glove with the thumb being completely incased in a rigid tube.

The disadvantages of the above-identified prior art keyboards are substantially overcome with the "ALPHA-NUMERIC KEYBOARD" of applicant's above-identified co-pending application. That keyboard causes the thumbs to be extensively used and the fingers always to be in a "home" position. In addition, the keyboard is divided into two separate sections which underlie and support the palm of each hand and which may be spaced in any relative location for the comfort and convenience of the operator.

Spatial data entry devices also are becoming extensively used, generally as a supplement or auxiliary device in conjunction wtih a keyboard. Such spatial data entry devices typically are in the form of "mice", trackballs, joy sticks, and tablets. Every one of these devices requires the hands of the computer operator to leave the keyboard to operate the device.

Tablets are essentially electronic "sticks". They generally are confined to artistic free-hand use and some graphics. Tablets generally are quite poor in use for most other applications since they require a major interruption of keyboard use and because they tend to input absolute rather than relative spatial information.

Joy sticks generally are in one or two forms. The first comprises a vertical lever which may be moved in any direction in a 360° circle about the base of the lever to convert anfular rotation to linear movement. The second fractionates the motion into non-quantified directional vectors, such as up, down, left and right. These devices at the present time are generally confined to computer games and are not currently sufficiently precise for precision work. As mentioned previously, like tablets, joy sticks require the hand to leave the keyboard if they are used in conjunction with a keyboard for entering alphanumeric data.

The most commonly used spatial devices are mice and trackballs. Both of these devices permit the hand to input spatial information and to manipulate visual displays on the cathode ray tube (CRT) employed with most computer displays. Mice are the primary spatial input devices used for serious computer and word processor use. Since 1980, mice have been included in the majority of the successful new micro-computer systems. Substantial software utilizing mice has been developed and this is currently one of the fastest growing areas of software development.

Mice are generally in the form of a small box, usually placed off to the right side or the left side of an otherwise standard computer keyboard. The box rests on the surface of a desk or a table; and when the mouse input is desired, the box movement over the table in various directions is translated into comparable two-dimensional movement on the CRT screen. Mice generally are used to manipulate things on the screen, such as moving cursor or insertion point markers (as used for editing and controlling text and numeric data entry and selecting "cells" within spread sheet programs), operating pull-down menus and windows, manipulating on screen text and drawings, and generating graphics. The use of a mouse with presently known computers, however, requires the hand to leave the keyboard to operate the mouse. This is disruptive of the continuous and rapid flow of information between keyboard, mouse, and computer.

Trackballs are essentially "upside down" mice. The major advantage over mice is that the location remains constant and close to the keyboard which allows easier alternation between the keyboard and the trackball. Trackballs require less desk space then most mice. The major disadvantage of a trackball, however, is that it is less controllable than a mouse and it is somewhat less intuitive in use. Like mice, however, trackballs require the hand to leave the keyboard.

All of the presently known spatial data entry devices which are operated by the hand require the hand to leave the keyboard for operation of the spatial device. To overcome this problem, a device has been developed which consists of a headband containing an ultrasonic receiver for detecting head movement. The receiver converts the movement to mouse-type movement signals to manipulate icons on the computer screen. The device is somewhat awkward to use, but one very important advantage of this device is that it permits simultaneous use of the keyboard and the headband device without removing the hands from the keyboard. The headband, however, is cumbersome; and when it is being used, it requires significant restraints on the head movements of the operator.

The Culver U.S. Pat. No. 4,712,101 discloses a keyboard which has a spatial data entry device located beneath the keys on the top surface of the keyboard. Culver discloses a conventional keyboard configuration operated by the two hands of an operator in conventional fashion. This conventional keyboard is modified to provide a spatial input device or a cursor positioning device located on the top of the keyboard housing near the front edge. This input device is in the form of a rotatable cylinder which also may be moved from end to end to provide the desired cursor movement. Lateral movement or rotation of the roller bar relative to the rest of the Culver keyboard is used to produce the spatial input or cursor positioning input. The device of Culver requires the hands or palms of the hands of the operator actually to directly contact the roller bar to provide the rotational and side-to-side motion for the spatial data entry input.

The device disclosed in the Culver Patent requires the hand or fingers to leave the "home" position for at least some of the operations of the roller bar. Rotation of the bar toward the operator requires the hand to be pulled away from the keyboard and rolled over the bar in the direction of the operator. Similarly maximum side-to-side or end-to-end movement of the roller necessarily pulls some or all of the fingers away from the home key positions of the keyboard. After each operation of the roller bar of Culver, the hands must be repositioned to locate the fingers in the home key positions of the standard data entry portion of the keyboard for subsequent entry of data. The device of Culver is an improvement over a conventional keyboard with a separate mouse only to the extent that the movements of the hands from the keyboard to the spatial data entry device and back again is more limited with the device of the type of Culver than it is for conventional separate keyboard and mouse systems.

It is desirable to provide an improved data device which combines a finger actuated keyboard and a mouse in a single, easy to use unit which overcomes the disadvantages of the prior art and which is particularly suitable for utilization as a computer input keyboard.

SUMMARY OF THE INVENTION

It is an object of this invention to provide an improved computer data entry system.

It is another object of this invention to provide an improved data entry system for a computer which combines keyboard and mouse functions in a single movable unit.

It is an additional object of this invention to provide an improved keyboard and mouse data entry device which is of small size and of greater capacity than conventional computer keyboards.

It is a further object of this invention to provide an improved data entry keyboard/mouse combination in which the fingers and thumb of the operator always remain in a "home" position and with which the mouse operation may be effected by moving the entire keyboard without removing the fingers and thumb from such "home" position.

It is yet another object of this invention to provide a data entry keyboard and mouse device in the form of physically separate right hand and left hand sections each having an independently operated mouse device in it.

It also is an object of this invention to provide an improvement in computer mouse control with simultaneous utilization of two mice.

It is a more specific object of this invention to provide a two mouse computer data input system where one mouse provides one function and the other mouse provides another function, such as two independently controlled pointers, vernier mouse control (rapid and slow), three-dimensional graphics control and the like.

In accordance with a preferred embodiment of this invention, a computer data input system comprises a housing member which is adapted to underlie the palm of a hand of a operator. The housing member has data input keys on the upper surface for operation by the fingers of the operator. A mouse is mounted within the housing member and has an input on the lower surface of the housing member. The entire housing member is movable by the hand of the operator to operate the input of the mouse as the housing member is moved about on a surface, without removing the fingers from the positions adjacent the input keys on the upper surface.

DETAILED DESCRIPTION

Reference now should be made to the drawings, in which the same reference numbers are used throughout the different figures to designate the same components.

Figure 1:
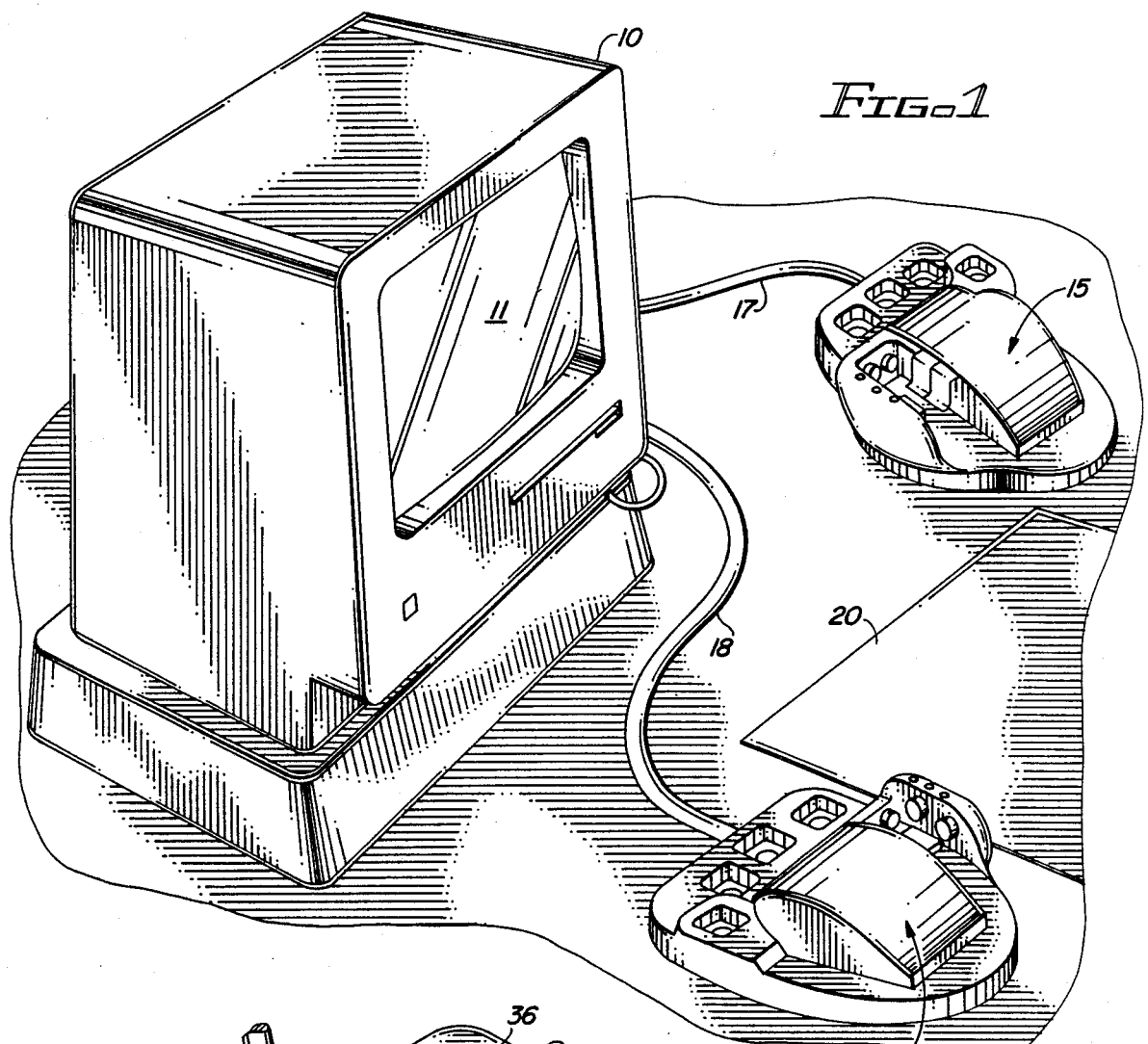
FIG. 1 is a perspective view of a preferred embodiment of the invention.

FIG. 1 shows a computer system employing a preferred embodiment of the invention. A typical computer 10, which has a cathode ray tube (CRT) display screen 11 is illustrated. In place of a conventional keyboard and/or mouse, however, a pair of separate hand-sized right and left data entry devices 15 and 16 are provided. These devices provide separate thumb and finger positions in the form of receiving wells for freely receiving the thumbs and fingers of each hand on the respective devices 15 and 16. Within these wells, alphanumeric data entry keys are clustered; so that each finger and thumb is capable of operating a number of different keys from a single "home" position. For the fingers, five keys are provided at each position; and for the thumbs, up to seven keys are provided. The structure and function of this data entry device, so far as the keyboard operation is concerned, is described in substantial detail in applicant's above-mentioned co-pending application. For that reason, the specific key assignments are not discussed here.

As is readily apparent from FIG. 1, the use of two physically separate movable devices 15 and 16 for the two hands of the operator permits text materials such as the paper 20 to be placed in a most natural position in front of the operator between the hands which are placed on the devices 15 and 16. Input cables 17 and 18 interconnect the computer 10 with the devices 15 and 16 in the manner of connection of a conventional keyboard or other data entry device. Also as illustrated in FIG. 1, the data entry devices 15 and 16 are relatively small (only somewhat larger than the palm of a hand) and do not need to be placed in line with one another, if different positions are more confortable or more convenient for a particular operator.

Figure 2:
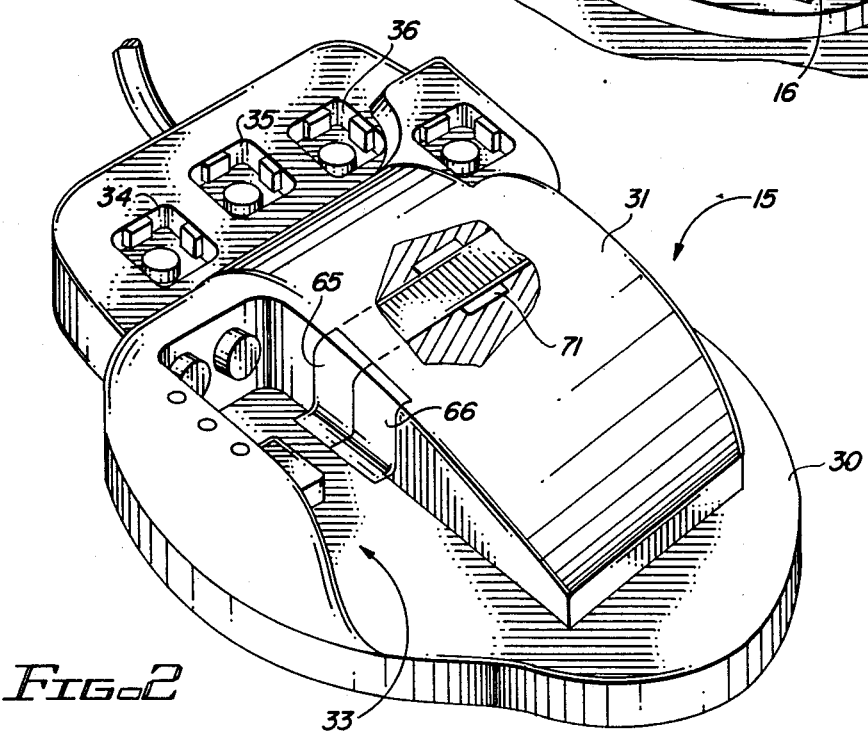
FIG. 2 is an enlarged top perspective view of a portion of the embodiment shown in FIG. 1.

As shown more clearly in FIG. 2, which is an enlarged detail of the device 15 (the device 16 is a mirror image of this one and for that reason is not shown), the data entry device comprises a platform 30 which rests on a desk or table top. On this platform 30 is a raised central portion 31 which supports the palm of the hand of the operator, with the thumb extending into the recess 33 and the index, middle, ring, and little fingers extending into wells 34, 35, 36, and 37, respectively. The location of the recess 33 and the wells 34, 35, 36, and 37, is selected to permit the thumb and fingers of the operator to extend in a normal curved, relaxed, comfortable position.

This is in dramatic contrast to a conventional keyboard which requires the fingers to unnaturally and uncomfortably conform to a nearly flat plane which they stretch and curl. The unnatural motion and position caused by operation of conventional keyboards produces finger fatigue in almost all persons who operator such a keyboard for extended periods of time. In addition, with a standard or conventional keyboard, the operator has to support the entire weight of the hands and forearms poised just above the keyboard. This is a stressful and uncomfortable position to maintain. In a relatively short time this position generates significant discomfort in an inexperienced keyboard operator and even experienced operators find the position uncomfortable after prolonged typing.

With a data entry system utilizing input devices 15 and 16 as shown, the operator can rest the palms of the hands on the raised portion 31 (and a similar portion on the device 16) over a large area, with the finger and thumb extending downwardly curled from this area. This provides needed support for the weight of the hands and forearms and stabilizes the hands and fingers in a relaxed comfortable position within millimeters of each and every key. The thumb and fingers are not captivated or clamped into the device, but are free for movement.

Figure 3:
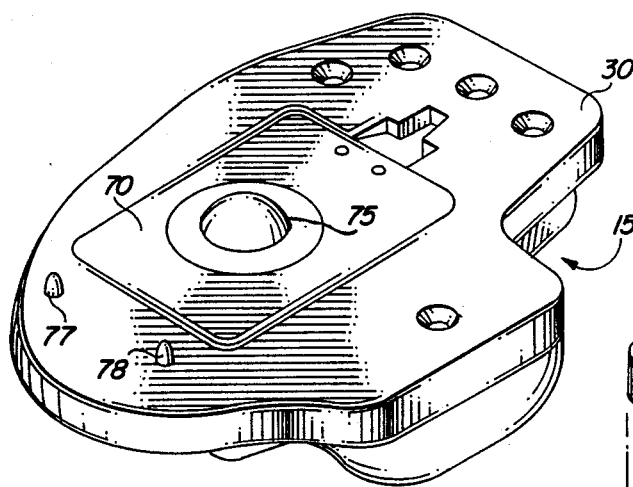
FIG. 3 is a bottom perspective view of the device shown in FIG. 2.
Figure 3:
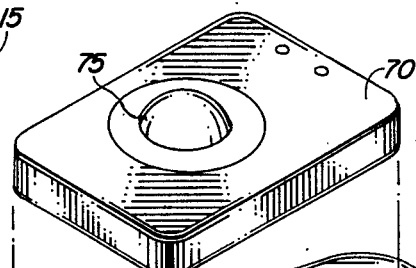
Figure 4:
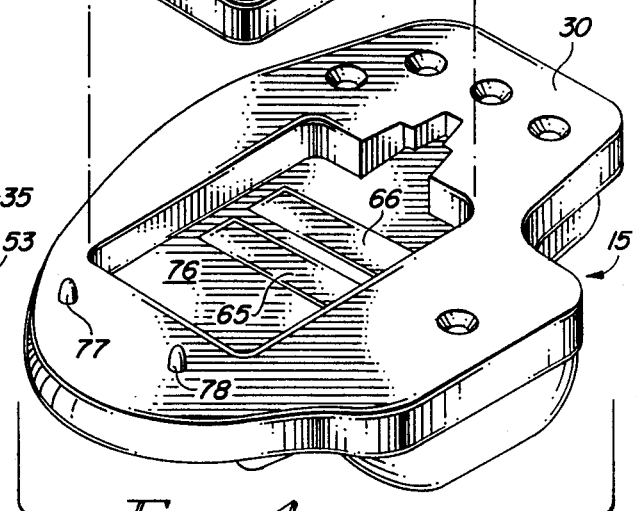
FIG. 4 is an exploded view of the device shown in FIG. 3.

In addition to providing the improved keyboard data entry capability described above and described in greater detail in the above mentioned co-pending application, one or both of the devices 15 and 16 also may incorporate as an integral part, a computer "mouse" of the type widely used today. This is shown more clearly in FIGS. 3 and 4. These figures illustrate the underside of the right hand device 15 to show a well 76 formed beneath the raised portion 31. A computer mouse 70, having an operating "click" or "on/off" button 71 on it and with a surface engaging data input sensor 75 on its bottom, is inserted into the well 76.

The mouse 70 may be a conventional mouse, such as used with many popular computers today, and the well 76 simply needs to be conformed to accommodate the outer shape of such a conventional mouse. The mouse may be inserted into the well 76 without any alteration whatsoever. On the other hand, the mouse 70 also may be built into the device 15 (or 16) as an integral part. For original equipment computers, this latter approach most likely will be implemented. Whether the mouse is an integral part of the device 15 or is "swallowed-up" in the device as illustrated separately connected to the computer 10 or incorporated into the cable 17 illustrated in FIG. 1.

Figure 5:
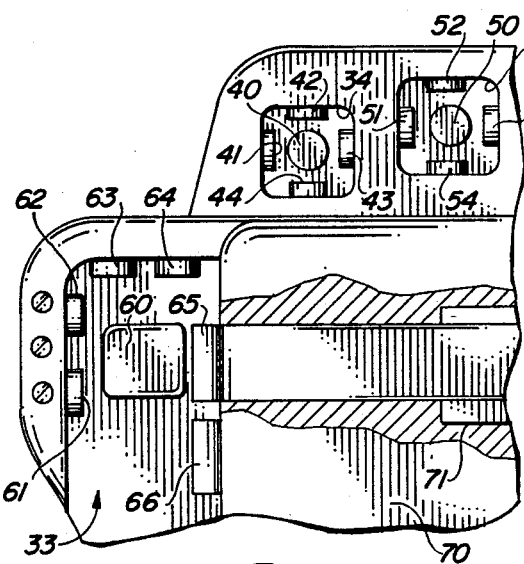
FIG. 5 illustrates details of a portion of the device shown in FIGS. 2 through 4.

FIG. 5 illustrates in detail the upper left portion of the device 15 shown in FIG. 2. The thumb slot 33 and the finger wells 34 and 35 are shown, with an illustration of the five switches 40 through 44 which are engaged by the index finger in the well 34 and the five switches 50 through 54 which are engaged by the middle finger when it is inserted into the well 35. Similarly, the thumb switches 60 through 66 which are disclosed in the bottom and on the three closed sides of the thumb cavity 33 are shown. The manner in which these switches are operated, and the particular functions which are assigned to those switches is described in detail in applicant's co-pending application. For the purposes here, it is sufficient to note that the thumb and tips of the fingers always remain in a "home" position within the respective openings or wells and may be moved downwardly, or forward, back, left, or right in a three dimensional pattern to operate the respective switch which produces the desired indicia or function for operation of the computer 10. The fingers are not held "captive" but the fingertips are free to move within each of the wells to provide different tactile feedback for each different key operation.

In addition, however, the right thumb may be squeezed downwardly and inwardly toward the raised central portion 31 of the device 15 to depress a push button lever or actuator 65 or 66. These push button levers are shown most clearly in FIGS. 2 and 5. The push button lever 65 has an extension (see FIG. 2) which overlies and rests on the normal "click" or "on/-off" button 71 on the top of the mouse 70. Thus, depression of the push button 65 against the normal upward spring bias of the button 71 causes operation of the mouse button 71 in its normal manner. As a result, any time the mouse button input is desired, the operator simply squeezes the right thumb downwardly and inwardly against the push button lever 65 to operate the button 71 on the mouse to obtain the desired conventional results. A similar push button lever 66 may be employed for mouse devices which have two input buttons. The operation of the button 66 is the same as the operation of the button 65 and accomplishes the desired result for such two-input devices.

It is readily apparent that since the device 15 may be moved about by the hand at any time, the mouse 70 may be operated without ever requiring the hand to be moved from the device. This means that the hand is always on the device and is always able to execute the mouse function without ever moving the fingers and thumb away from their constant "home" key positions. Since the mouse 70 is built into the device 15, the mouse is always available and ready for more frequent use than in conventional systems which require the operator to remove the hand completely from the keyboard in order to operate the mouse.

By incorporating the mouse 70 into the device 15, it also is possible for software designers to develop programs which are capable of employing simultaneous key and mouse operations and significant enhancement of the operating capabilities of programs will result.

Figure 6:
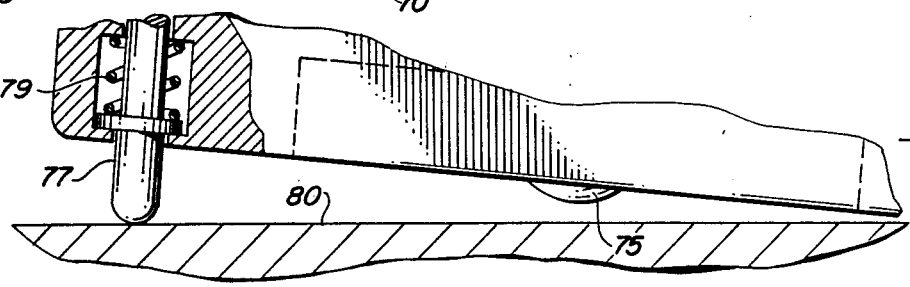
FIGS. 6 and 7 are partially cut-away views illustrating additional operating characteristics of the device of FIGS. 2 through 5.
Figure 7:
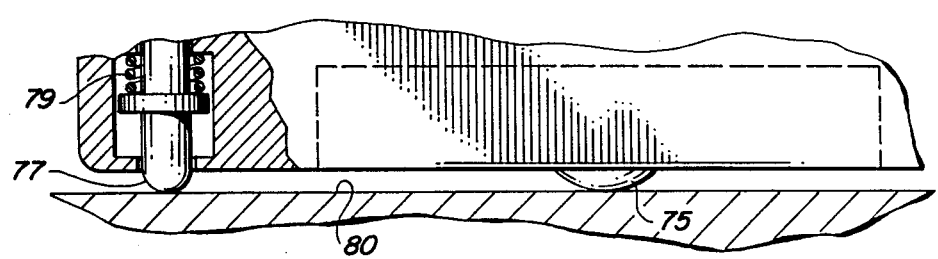

It may be desirable from time-to-time to move the device 15 without engaging the mouse input sensor 75 on the surface of the table or desk on which the device 15 is placed. To permit this, a pair of spring-loaded skids 77 and 78 are provided to raise the device slightly by the action of compression springs 79; so that the mouse actuating member 75 does not touch the top of the table 80, or so that the motion detection device is inactivated. This is illustrated in FIG. 6. By means of a slight downward pressure on the palm of the hand, however, the spring 79 may be compressed to cause the engaging member 75 or the activation of a motion detection apparatus of the mouse to engage the table surface 80 as shown in FIG. 7. The mouse then may be operated in its conventional manner. Such operation, however, is accomplished by movement of the entire device 15, which is only slightly larger than a standard mouse to effect the desired operating result.

By permitting the device to swallow or incorporate already existing mice, the data entry devices 15 and 16 readily may be used with already existing computers having a mouse as a feature. No alteration whatsoever of such a mouse is required for incorporating a standard mouse 70 into either of the devices 15 or 16. In addition, it is readily apparent that the possibility of providing a separate mouse under each device 15 and 16 is present, thereby significantly expanding potential uses for "mice" with computers of the future.

When a mouse is provided under each of the devices 15 and 16 having the characteristics which have been described above in detail, significant new possibilities for computer data entry exist. This is done also without any increase in the footprint or size of the data entry devices 15 and 16, and with no increase in cabling complexity between the devices 15 and 16 and the computer 10. One of the advantages obtainable from providing a mouse under each of the data entry devices 15 and 16 is a vernier mouse control. This can be added to most computer applications with no software or hardware alterations whatsoever. This can be accomplished simply by making the left hand motion of the data entry device 16 a course or rapid mouse control and the right hand motion of the data entry device 15 a fine or slow mouse control (or vice-versa). The two controls may be integrated into a single composite control signal for a cursor or the like. All of the features which have been described above continue to be present, so that the fingers never need to leave the "home" positions of the keys on the data entry devices 15 and 16 to operate the mouse of either device either simultaneously with data entry or alternatively with such data entry.

Another significant feature which is obtainable from a left hand and right hand independent mouse under each of the data entry devices 15 and 16, is simultaneous three dimensional control for three dimensional graphics CAD and other applications. Once again by way of example, the mouse under the data entry device 15 for the right hand may be used to control the existing "X and Y" axes, while the mouse under the left hand data entry device 16 may be used to input the "Z" axis coordinate. Such simultaneous operation is quickly and easily learned and is essentially intuitive.

A third operating characteristic which is obtainable with a separate two mouse system and which is wholly unattainable with known devices is simultaneous two point screen control. For example, diagonally opposite corners of a rectangle may be separately controlled by each mouse device. This provides simultaneously control over both size and location in a graphics or CAD type of application. The same selection method may be used to enhance text selection in a word processor or field selection in a spread sheet application. By way of example, and by no means a limitation, text selection may be provided horizontally across the page by means of the mouse associated with the right hand data entry device 15 along with simultaneous line selection by means of the mouse associated with the left hand data entry device 16. The number of applications are limited only by the imagination of the potential users. Since the hands always remain in position to operate the data entry keys without ever removing the fingers from the home key positions, the versatility of the two mouse operation through the independently operated and independently movable data entry devices 15 and 16 is significant.

Various changes and modifications will occur to those skilled in the art without departing from the true scope of the invention. For example, representation of the mouse which is used is simply for purposes of illustration and is not to be considered to be as limiting. Furthermore, the particular shape and configuration of the input devices 15 and 16 may be altered without departing from the true and intended scope of the invention.

I claim:

1. A computer data input control system including in combination:
  a first housing member having a graspable raised, substantially convex, central portion adapted to underlie and support the palm of at least one hand of an operator in a natural relaxed concave position, with the fingers freely dangling so that the fingertips of each finger extend substantially vertically downwardly, said housing member having an upper surface and a lower surface;
  a plurality of data input keys arranged adjacent said raised central portion in groups of predetermined three dimensional patterns at each of the thumb and fingertip positions of the hand of such operator on the upper surface of said housing member, each group operated by different fingertips of an operator from a constant home position, wherein each finger is capable of activating all of the keys of the associated group through finger movement alone, said finger positions comprising individual fingertip wells, each having a bottom and vertical sides with discrete key surfaces thereon for freely receiving the fingertips of an operator to permit multiple direction movement of the fingertips to contact different discrete ones of said key surfaces corresponding to the direction of movement of the fingertips, and wherein said data input keys are located in various positions in said wells so that said data input keys may be operated by the fingertips in said constant home position;
  at least a first mouse means mounted within said housing member having a push button switch and having a movement detection input means extending from the lower surface of said housing member for contacting a support surface;
  first control means on said housing member comprising a push button switch actuator located at said thumb position for engagement by the thumb and coupled with said first mouse means for operating said push button switch of said first mouse means, said entire first housing member being movable by said hand of such operator without removal of said fingertips from said constant home position to operate said movement detector input means of said first mouse means as said first housing member is moved on a support surface; and
  means for coupling said mouse means and said data input keys with a processing device.

2. The combination according to claim 1 further including means mounted on said first housing member for disabling said movement detection input means of said first mouse means when operation of said first mouse means is not desired.

3. The combination according to claim 2 wherein said movement detection input means comprises a surface engaging means, said disabling means on said first housing member includes a spring member for lifting said surface engaging means out of engagement with a surface underlying said first housing member, and wherein the force of said spring member is overcome by a downward pressure through the palm of the hand of said operator to cause the surface engaging means of said first mouse member to engage a surface underlying the lower surface of said first housing member when operation of said first mouse means is desired.

4. The combination according to claim 3 wherein said housing member is adapted to underlie the palm of only one hand of an operator.

5. The combination according to claim 1 wherein said first housing member is graspable and is adapted to underlie and support the palm of only one hand of an operator; and further including a second physically separate housing member having a graspable raised, substantially convex, central portion adapted to underlie and support the palm of the other hand of an operator in a natural relaxed concave position, with the fingers freely dangling so that the fingertips of each finger extend substantially vertically downwardly, said second housing member having a plurality of data input keys thereon physically arranged in a mirror image of the groups of keys on said first housing member for operation by the fingertips of said other hand of an operator from a constant home position, said second housing member including a second mouse means mounted within said second housing member and having a movement detection input means extending from the lower surface of said second housing member for contacting a support surface;
  second control means on said second housing member coupled with said second mouse means for operating a switch of said second mouse means, said entire second housing member being movable by a hand of such operator without removal of the fingertips from said constant home position to operate said movement detector input means of said second mouse means as said second housing member is moved independently of said first housing member on a support surface;
  wherein said data input keys are divided between said first and second housing members; and said means for coupling said mouse means couples said first and second mouse means and said data input keys on both of said first and second housing members with said processing device.

6. The combination according to claim 1 wherein said first and second mice means function to provide vernier mouse control with said first mouse means supplying rapid mouse movement signals and said second mouse means providing mouse movement signals which are slower than said first mouse means.

7. The combination according to claim 6 wherein the signals from said first and second mice means are integrated into a single composite mouse control signal.

8. The combination according to claim 5 wherein said second control means on said second housing member is located at said thumb position and comprises a push button switch actuator for engagement by the thumb; and wherein said second mouse means has a push button switch thereon, said second mouse means being mounted within said second housing memebr to cause the push button switch on said second mouse means to be operated by said push button thumb switch actuator.

9. The combination according to claim 8 wherein said first and second mice means function to provide vernier mouse control with said first mouse means supplying rapid mouse movement signals and said second mouse means providing mouse movement signals which are slower than said first mouse means.

10. The combination according to claim 9 wherein the signals from said first and second mice means are integrated into a single composite mouse control signal.

11. The combination according to claim 8 wherein the signals produced by said first and second mice means are mutually independent signals such that the signal generated by said first mouse means may be differentiated from the signal generated from said second mouse means.

12. The combination according to claim 8 wherein said mouse means is removably mounted in a cavity in the lower surface of the housing member.

13. The combination according to claim 5 further including means on said second housing member for disabling said movement detector input means of said second mouse means when operation of said second mouse means is not desired.

14. The combination according to claim 13 wherein said disabling means on said second housing member includes a spring member for lifting said movement detecting input means out of engagement with a surface underlying said second housing member, and wherein the force of said spring member is overcome by a downward pressure through the palm of the hand of said operator to cause said input means of said second mouse member to engage a surface underlying the lower surface of said second housing member when operation of said second mouse means is desired.

15. A computer data input control system including in combination:
- a first housing member having a graspable raised, substantially convex, central portion adapted to underlie and support the palm of at least one hand of an operator in a natural relaxed concave position, with the fingers freely dangling so that the fingertips of each finger extend substantially vertically downwardly, said housing member having an upper surface and a lower surface;
- a plurality of data input keys arranged adjacent said raised central portion in groups of predetermined three dimensional patterns at each of the thumb and fingertip positions of the hand of such operator on the upper surface of said housing member, each group operated by different fingertips of an operator from a constant home position, wherein each finger is capable of activating all of the keys of the associated group through finger movement alone, said finger positions comprising individual fingertip wells, each having a bottom and vertical sides with discrete key surfaces thereon for freely receiving the fingertips of an operator to permit multiple direction movement of the fingertips to contact different discrete ones of said key surfaces corresponding to the direction of movement of the fingertips, and wherein said data input keys are located in various positions in said wells so that said data input keys may be operated by the fingertips in said constant home position;
- at least a first mouse means mounted within said housing member and having a movement detection input means extending from the lower surface of said housing member for contacting a support surface;
- first control means on said first housing member coupled with said first mouse means for operating a switch of said first mouse means, said entire first housing member being movable by said hand of such operator without removal of said fingertips from said constant home position to operate said movement detector input means of said first mouse means as said housing is moved on a support surface;
- a second physically separate housing member having a graspable raised, substantially convex, central portion adapted to underlie and support the palm of the other hand of an operator in a natural relaxed concave position, with the fingers freely dangling so that the fingertips of each finger extend substantially vertically downwardly, said second housing member having a plurality of data input keys thereon physically arranged in a mirror image of the groups of keys on said first housing member for operation by the fingertips of said other hand of an operator from a constant home position, said second housing member including a second mouse means mounted within said second housing member and having a movement detection input means extending from the lower surface of said second housing member for contacting a support surface;
- second control means on said second housing member coupled with said second mouse means for operating a switch of said second mouse means, said entire second housing member being movable by a hand of such operator without removal of the fingertips from said constant home position to operate said movement detector input means of said second mouse means as said second housing member is moved independently of said first housing member on a support surface;
- wherein said data input keys are divided between said first and second housing members and the signals produced by said first and second mice means are mutually independent signals such that the signal generated by said first mouse means may be differentiated from the signal generated by said second mouse means; and
- means for coupling said first and second mouse means and said data input keys on both of said first and second housing members with said processing device.

16. A computer data input control system including in combination:

a first housing member having a graspable raised, substantially convex, central portion adapted to underlie and support the palm of at least one hand of an operator in a natural relaxed concave position, with the fingers freely dangling so that the fingertips of each finger extend substantially vertically downwardly, said housing member having an upper surface and a lower surface;

a plurality of data input keys arranged adjacent said raised central portion in groups of predetermined three dimensional patterns of each of the thumb and fingertip positions of the hand of such operator on the upper surface of said housing member, each group operated by different fingertips of an operator from a constant home position, wherein each finger is capable of activating all of the keys of the associated group through finger movement alone, said finger positions comprising individual fingertip wells, each having a bottom and vertical sides with discrete key surfaces thereon for freely receiving the fingertips of an operator to permit multiple direction movement of the fingertips to contact different discrete ones of said key surfaces corresponding to the direction of movement of the fingertips, and wherein said data input keys are located in various positions in said wells so that said data input keys may be operated by the fingertips in said constant home position;

at least a first mouse means having an operating switch mounted within said housing member and having a movement detection input means extending from the lower surface of said housing member for contacting a support surface;

first control means on said housing member coupled with said operating switch of said mouse means for operating said operating switch of said mouse means, said entire first housing member being movable by said hand of such operator without removal of said fingertips from said constant home position to operate said movement detector input means of said mouse means as said housing is moved on a support surface; and means for coupling said mouse means and said data input keys with a processing device.

17. The combination according to claim 16 wherein said mouse means is removably mounted in a cavity in the lower surface of said housing member.

* * * * *